United States Patent
Long

(10) Patent No.: US 11,150,097 B2
(45) Date of Patent: *Oct. 19, 2021

(54) SYNTHETIC DATA COLLECTION FOR VEHICLE CONTROLLER

(71) Applicant: Clever Devices Ltd., Woodbury, NY (US)

(72) Inventor: Cody Long, Woodbury, NY (US)

(73) Assignee: Clever Devices Ltd., Woodbury, NY (US)

( * ) Notice: Subject to any disclaimer, the term of this patent is extended or adjusted under 35 U.S.C. 154(b) by 358 days.

This patent is subject to a terminal disclaimer.

(21) Appl. No.: 16/504,603

(22) Filed: Jul. 8, 2019

(65) Prior Publication Data

US 2019/0331500 A1    Oct. 31, 2019

Related U.S. Application Data

(62) Division of application No. 14/861,317, filed on Sep. 22, 2015, now Pat. No. 10,386,191.

(51) Int. Cl.
*G01C 21/32* (2006.01)
*G06F 16/29* (2019.01)

(52) U.S. Cl.
CPC .............. *G01C 21/32* (2013.01); *G06F 16/29* (2019.01)

(58) Field of Classification Search
None
See application file for complete search history.

(56) References Cited

U.S. PATENT DOCUMENTS

| | | | | |
|---|---|---|---|---|
| 4,086,632 A * | 4/1978 | Lions | ..................... | G01C 21/00 701/418 |
| 5,948,040 A * | 9/1999 | DeLorme | ............. | G09B 29/106 701/426 |
| 6,321,158 B1 * | 11/2001 | DeLorme | ............... | G01C 21/26 340/995.16 |
| 6,374,176 B1 * | 4/2002 | Schmier | ................. | G08G 1/123 701/465 |
| 6,618,668 B1 * | 9/2003 | Laird | ..................... | G06Q 10/08 340/994 |
| 8,369,606 B2 * | 2/2013 | Liu | .................... | G06K 9/00476 382/153 |
| 2005/0270311 A1 * | 12/2005 | Rasmussen | ............. | G06T 11/40 345/677 |

(Continued)

*Primary Examiner* — Thomas E Worden
(74) *Attorney, Agent, or Firm* — Maier & Maier, PLLC

(57) ABSTRACT

A method for providing waypoint data to a vehicle controller. This method may include obtaining a plurality of coordinate locations describing a vehicle route, performing a computation of the vehicle route using said coordinates, obtaining route data describing the route, transforming the route data into coordinate data comprising a plurality of data points expressed in longitude and latitude form, converting the coordinate data into properly-spaced waypoint data, storing the waypoint data in a form accessible to a vehicle controller, and accessing the waypoint data via a vehicle controller. According to an exemplary embodiment, the properly-spaced waypoint data may be created from improperly-spaced data via interpolation. The vehicle controller may control other devices associated with a vehicle, such as an automated voice announcement system or an external display.

18 Claims, 5 Drawing Sheets

(56) References Cited

U.S. PATENT DOCUMENTS

| | | | |
|---|---|---|---|
| 2006/0215923 A1* | 9/2006 | Beatty | G06T 9/00 |
| | | | 382/253 |
| 2008/0010009 A1* | 1/2008 | Miyoshi | G01S 19/48 |
| | | | 701/438 |
| 2011/0196610 A1* | 8/2011 | Waldman | G01C 21/3644 |
| | | | 701/533 |
| 2011/0313655 A1* | 12/2011 | Litvack | G01C 21/20 |
| | | | 701/426 |
| 2013/0096819 A1* | 4/2013 | Tarnok | G01C 21/20 |
| | | | 701/428 |
| 2016/0165136 A1* | 6/2016 | Mitsui | H04N 5/23238 |
| | | | 348/36 |
| 2017/0011629 A1* | 1/2017 | Lau | H04W 4/029 |

* cited by examiner

SYNTHETIC DATA COLLECTION FOR VEHICLE CONTROLLER

CROSS-REFERENCE TO RELATED APPLICATIONS

The present patent application claims priority as a divisional application from U.S. patent application Ser. No. 14/861,317, entitled "SYNTHETIC DATA COLLECTION FOR VEHICLE CONTROLLER," filed on Sep. 22, 2015, which is hereby incorporated by reference into the present disclosure.

BACKGROUND

Mass transit vehicles typically employ an information system in order to provide passengers with status updates and other useful information. For example, a controller installed on a mass transit vehicle such as a bus or shuttle may, when the vehicle is approaching a stop or when a stop has been requested, play pre-recorded audio and/or display text on a sign to announce that the stop is approaching. These information systems may be used in order to convey a diversity of information to the passengers; details like the mass transit vehicle's current route, its current location, any applicable tour and sightseeing information, and any applicable event information may all be presented.

The controllers on mass transit vehicles, and other similar information systems, are often reliant on outside information to function. Some of this information, like whether or not a stop has been requested by any of the passengers or whether there are any events that are scheduled to occur in the near future, might be manually entered or enterable into the controller. However, other information to be provided by the controller, like when the next scheduled stop is approaching or any location-based tour and sightseeing information, may be harvested from a combination of global positioning system data and the odometer reading of the mass transit vehicle. Using these two values, the controller can predict when to make an announcement for the next approaching stop.

When making these location determinations, a controller typically must measure a GPS location and an odometric distance, and must make a comparison between the measured GPS location and measurement of distanced traveled to a database of GPS waypoints and distances. Such databases have to be constructed before they can be used, and must be populated with, at minimum, the GPS waypoint data and distance data for the routes that the mass transit vehicle using the controller will follow.

One way of populating these databases is by manual data collection. This involves sending a GPS instrumentation vehicle out to follow the bus route or other mass transit vehicle route, and having this GPS instrumentation vehicle collect GPS waypoint data and distances traveled between the mass transit vehicle's scheduled stops and/or likely stops. Software may then be used to combine route and stop locations such as might be provided by the local transit authority with this field-collected waypoint data ("Geopath" waypoint data) in order to create a controller database, containing information for all or some of the routes in the local transit authority's system.

However, certain factors may limit the effectiveness of this type of data collection. First, manual data collection is often expensive; the data collection process requires a dedicated GPS instrumentation vehicle to drive along all of the mass transit vehicle routes operated by the local transit authority, and may even require that this process be performed more than once if more or better data is needed. Such a process may take weeks or months to perform, and may require a part-time staff who must be trained to perform the data collection.

Second, such data collection can often be inaccurate. Ideally, waypoints will be collected with a uniform level of spacing, such as every 50 to 60 feet. However, in practice, manually-collected waypoints may be collected extremely inconsistently, due to factors like adverse road conditions or poor staff training. Certain terrain features, such as sharp curves or underground tunnels, may lead to errors in data collection or otherwise may be difficult to characterize accurately.

There may also be other obstacles, such as legal or regulatory obstacles, to manual data collection. For example, if a stretch of road is under construction at the time of manual data collection, manual data collection might have to wait until the construction is completed. According to another example, there might be a dedicated bus route that only buses are entitled to travel on; data collection along this route may be possible only at a certain time of day, or may require a special arrangement with the local transit authority, both of which may make manual data collection more difficult.

SUMMARY

According to at least one exemplary embodiment, a method of providing waypoint data to a vehicle controller may be described. This method may include obtaining a plurality of coordinate locations describing a vehicle route, performing a computation of the vehicle route using said coordinates, obtaining data describing the route, transforming this route data into coordinate data comprising a plurality of data points expressed in longitude and latitude form, converting this coordinate data into properly-spaced waypoint data, storing the waypoint data in a form accessible to a vehicle controller, and accessing the waypoint data via a vehicle controller. According to an exemplary embodiment, this properly-spaced waypoint data may be created from improperly-spaced data via interpolation. The vehicle controller may control other devices associated with a vehicle, such as an automated voice announcement system or an external display.

In another exemplary embodiment, a method for providing waypoint data to a vehicle controller may also be described. This method may include accessing an external mapping API, selecting a number of locations describing a vehicle route, obtaining a number of coordinates corresponding to this number of locations, instructing the external mapping API to perform a computation of the vehicle route using the coordinates, obtaining polyline-encoded vector data describing the vehicle route, transforming this polyline-encoded vector data into coordinate data having a number of data points expressed in longitude and latitude form, determining whether any of the distances between pairs of consecutive coordinate data points exceed an allowable distance for waypoints that may be permitted by a vehicle controller, adding, via interpolation, additional waypoints between these pairs of consecutive coordinate data points in those cases where the distances between pairs of consecutive data points exceeds the allowable distance for waypoints that may be permitted by the vehicle controller, and continuing to add additional waypoints until no distances between pairs of consecutive data points exceed the allowable distance, storing the waypoint data in a form accessible to a vehicle controller, and accessing the waypoint data via a vehicle controller.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

Exemplary

Exemplary

Exemplary

Exemplary

Exemplary

Exemplary

DETAILED DESCRIPTION OF THE EMBODIMENTS

Figure 1:
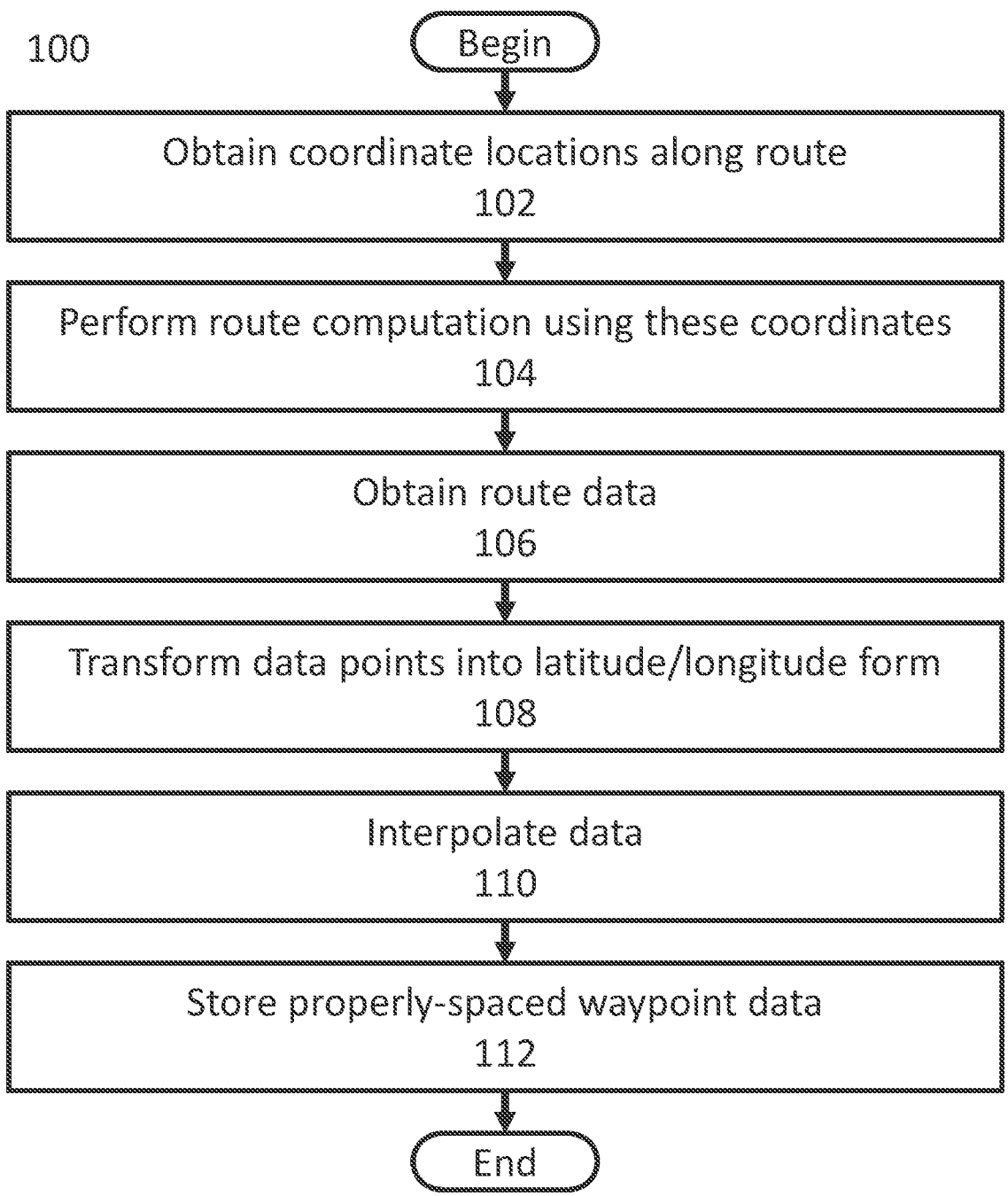
FIG. 1 shows a process flow diagram of a synthetic data collection system for a vehicle controller.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

According to an exemplary embodiment, and referring to the Figures generally, a process flow of a synthetic data collection system for a vehicle controller 100 may be provided. A user may begin the process by obtaining the locations, such as the GPS coordinate locations or other locations, of at least two points along a route 102. These locations might be, for example, two adjacent bus stops along a bus route defined by the local transit authority, or may be any other set of two or more points of interest. ("Bus" may also be used to refer to any other public transit vehicle, such as a coach, shuttle, streetcar, tram, subway train, or any other such vehicle, as desired. "Bus route" may likewise be used to refer to the route of any public transit vehicle or the like.)

According to one exemplary embodiment, this data may be readily available or may be retrieved automatically. For example, a local transit authority may have uploaded their bus routes to a mapping utility such as GOOGLE MAPS, may host their own mapping utility, or may host files that are compatible with a particular mapping utility. If such data is available, it can be retrieved from wherever it is available. According to another exemplary embodiment, a user may be able to define a bus route or other public transit route manually using a mapping utility, including any stops that may be made by the public transit vehicle, and may be able to export the entire route with all of these stops included. According to still another exemplary embodiment, a user may be limited in the extent to which they may be able to obtain the location data of points along a public transit vehicle route from a mapping utility; for example the user might only be able to obtain one point at a time, or may only be able to obtain a small plurality of data points at a time. Other exemplary embodiments may also be understood.

Once the user has generated a plurality of coordinates, the coordinates corresponding to bus stops or to points defined to be on the bus route, the user may then perform a route computation between two or more of these coordinates 104. This route computation may be accomplished using a commercial API or other commercial database that is oriented toward providing mapping data or route information. According to such an embodiment, a user may only provide the mapping API with two or more of the coordinates and may instruct the mapping API to generate a route between these coordinates, and the mapping API may be able to automatically generate a route between them. Alternatively, a non-commercial API or non-commercial database that is oriented toward providing mapping data or route information may be used. Exemplary APIs or databases that might be used include, but are not limited to, the GOOGLE MAPS API, the MICROSOFT BING MAPS API, the MAPQUEST API, the OPENSTREETMAPS API, or any combination thereof. For example, it may be that the MAPQUEST API offers a better route-finding algorithm, but that the OPENSTREETMAPS API offers a higher density of data points in the local area. Alternatively, another source of such information, such as a web crawler or private database server, may be used.

Once the user has performed a route computation between two or more coordinates 104, they may then extract or otherwise obtain the route data 106. According to some exemplary embodiments, this data may be provided in usable form by the API, database, or other information source, as desired. According to some other embodiments, this data may be provided in an encoded form, such as in a polyline encoded form, which may be decoded before use or otherwise put into spherical coordinate form 108, i.e. latitude and longitude. According to still other embodiments, the data may be formed into a usable form by a user-side tool, such as a web crawler tool.

For example, according to one exemplary embodiment, the GOOGLE MAPS API may be used to obtain directional data between two points. When a request for directions is made to the GOOGLE MAPS Directions API, the API may send back a string of polyline-encoded GPS points representing the calculated route and points along the route. For example, when a request is made for directions between two points, both on the same east-west roadway and spaced around 750 feet apart, an exemplary polyline, "ellfGlevbNl@vDJf@~@'EVx@xN'@," could be used to encode a number of coordinates representing this information and representing travel along this roadway from east to west. This polyline represents the GPS data points of the route in a vector-based form; a first point may be defined in terms of its latitude and longitude, and subsequent data points may be represented by their difference in latitude and longitude from the point immediately prior to them. The polyline provided by the API may then be transformed into a number of GPS points spaced along the desired route of travel; for example, in the case of the exemplary polyline provided above, it would encode a series of GPS points starting at the point 43.16115° N 79.25351° W, and ending at the point 43.16026° N 79.25606° W.

With regard to polyline encoding, polyline encoding may be a lossy compression algorithm that can allow a series of coordinates to be stored as a single string. Point coordinates may be encoded using signed values; for example, a negative number corresponding to a latitude value may be a latitude south, a positive number corresponding to a latitude value may be a latitude north, a negative value corresponding to a longitude value may be a longitude west, and a positive value corresponding to a longitude value may be a longitude east.

The polyline encoding process can convert a binary value into a series of character codes for ASCII characters using the standard base64 encoding scheme, for example the exemplary polyline given above, "ellfGlevbNl@vDJf@~@'EVx@ N'@." To provide for proper display of these characters, encoded values can be summed with 63 (which corresponds to the ASCII character '?') before converting them into ASCII. The algorithm may also check for additional character codes for a given point by checking the least significant bit of each byte group; if this bit is set to 1, the point may not yet be fully formed and additional data can or should follow.

As mentioned previously, polyline encoding can be a vector-based format; to conserve space, points other than the first point only can include the offset from the previous point, rather than being stored as coordinates themselves. All points may be encoded in Base64 as signed integers, as latitudes and longitudes are signed values. The encoding format within a polyline can represent two coordinates representing latitude and longitude to a reasonable precision. Given a maximum longitude of +/−180 degrees to a precision of 5 decimal places (180.00000 to −180.00000), this can result in a desire for a 32 bit signed binary integer value. (Backslashes can be interpreted as escape characters within string literals, and as a result outputs of backslash characters within a polyline are typically converted into double-backslash characters, which are not interpreted in this fashion.)

Figure 1A:
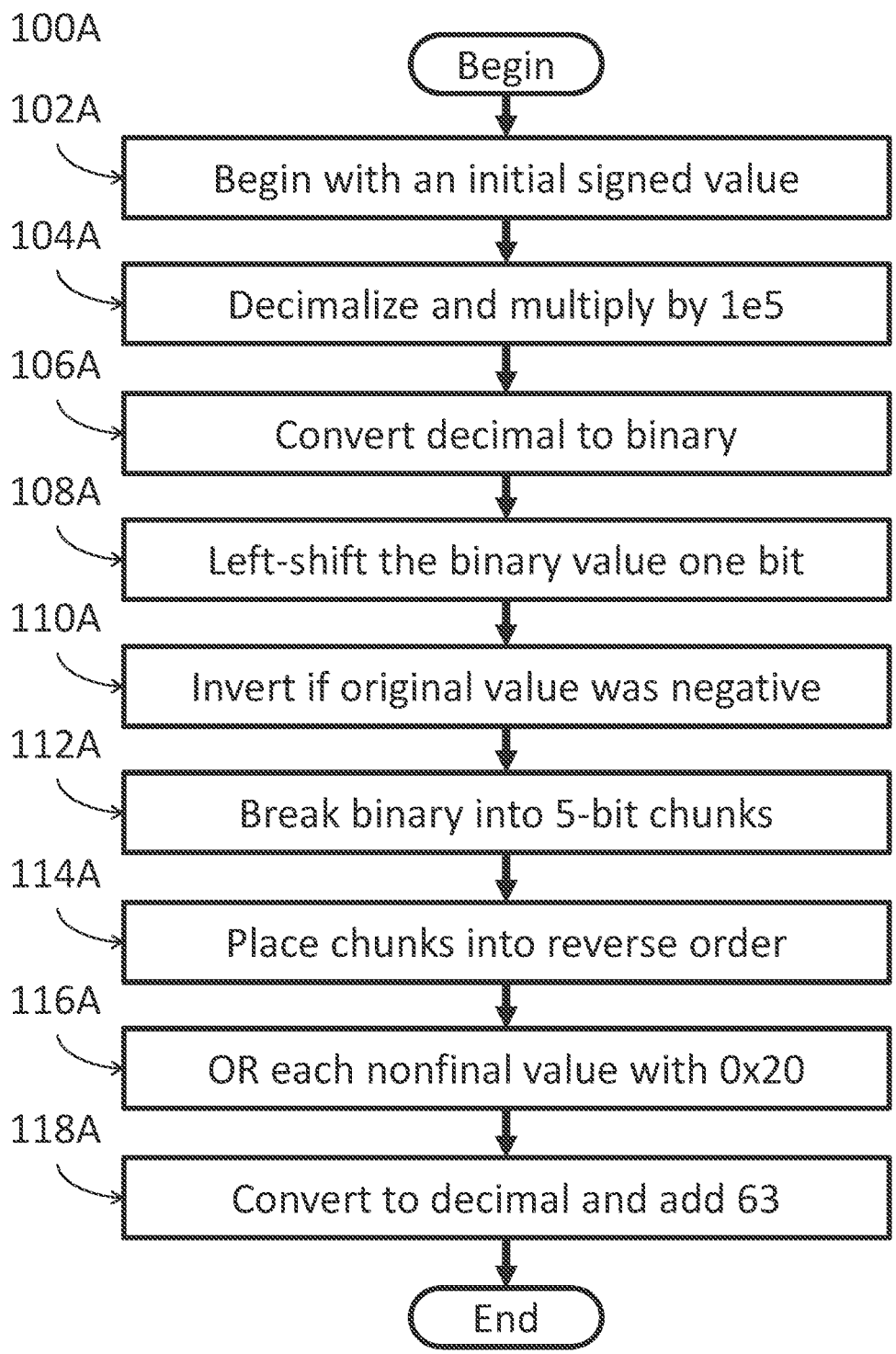
FIG. 1A shows a process flow diagram of a polyline decoding algorithm.

FIG. 1A depicts a method by which point values may be encoded in polyline form 100A in more detail. A user desiring to encode a coordinate in polyline form can first begin with a signed value 102A corresponding to a latitude or longitude coordinate value, with a positive sign representing north or east and a negative sign representing south or west. Next, a user can take the decimal value of this signed value and multiply it by 1e5, rounding the result to the nearest digit 104A, which may yield a whole-number integer with precision to five decimal digits. If the degree of precision required is more or less, a variant polyline encoding algorithm using a higher or lower degree of precision may be used instead. This decimal value may then be converted into a binary value 106A. A negative value can be calculated using its two's complement, which may require inverting the original binary value and adding one to the result.

In a further exemplary embodiment, it may be desirable to use a sign bit rather than storing a negative number as its two's complement. This might be, for example, for reasons of space efficiency; it may be desirable to use as few bits as possible, and negative numbers stored as a two's complement may have all or a significant fraction of the high bits set. As such, the encoding may be changed from the two's complement if the value is negative. To do this, whether the initial value was positive or negative, the binary value may be left-shifted by one bit 108A, adding a 0 on the right and removing the leading bit on the left. If the initial value was negative, this means that the leading 1 bit added by the two's complement transformation will be removed. If the initial value was negative, the resulting binary value should then be inverted 110A again, flipping the value of the rightmost bit to 1, indicating that a negative value is stored.

The binary value can then be parsed out into five-bit chunks 112A, starting from the right-hand side; according to an exemplary embodiment, this may allow the binary value to be encoded in base 64 (which allows for up to six bits to be stored). The 5-bit chunks can then be placed into reverse order 114A, so that the rightmost chunk is now the leftmost chunk and vice-versa; according to an exemplary embodiment, this may improve the speed with which a given polyline can be read.

A continuation bit may then be added to each of these five-bit data chunks. A continuation bit is a bit that, in many data types such as variable-length quantities (VLQ), indicates whether there is another data "chunk" left to follow or whether the current "chunk" is the final "chunk." For example, for information encoded in a data structure composed of eight-bit binary octets or "bytes," each byte may store seven bits of data and one continuation bit. The highest-order bit in this structure may be set to zero if the byte is the last byte in a chain of bytes representing a larger data value, and may be set to 1 if there is more data left to come.

As such, according to an exemplary embodiment of the algorithm, a continuation bit should be added in as the highest-order value for each of the 5-bit "chunks" used in the algorithm. To do this, the chunks can be conditionally ORed with 0x20 (0010 0000) if another bit chunk follows them 116A (turning them into six-bit "chunks" having a 1 as their highest-order bit). The final chunk should not, however, be ORed with this value, giving it a 0 in its highest-order bit if represented as a six-bit value; having a 0 value in its continuation bit indicates that it is the final chunk, and that any following information is the start of a new data value.

Each of these values can then be converted into decimal, and then converted into ASCII 118A. A predetermined value may be added to each decimal value before conversion of the decimal values into ASCII characters in order to ensure that potentially troublesome ASCII characters, like quotes and semicolons, are avoided in the final polyline string. According to an exemplary embodiment, this predetermined value may be 63, though other adjustment values and other variant adjustment methods may also be envisioned. This will yield the polyline encoding of a particular coordinate.

For example, a user may wish to encode the value −179.9832104, a longitude value west. The user will take this number and multiply it by 1e5, rounding the result to the nearest digit, yielding −17998321. The user will then convert this value to binary, resulting in the value 00000001 00010010 10100001 11110001. Since this is a negative value, however, it must be converted using the two's complement, requiring that the value be inverted (11111110 11101101 01011110 00001110) and that 1 be added to it (11111110 11101101 01011110 00001111).

Further, in the example, this value should then be left-shifted, removing the trailing 1 and adding a 0 to the end (11111101 11011010 10111100 00011110). Since the initial longitude value was negative, the resulting binary encoding should be inverted (00000010 00100101 01000011 11100001). This number will then be broken into 5-bit chunks, starting from the right-hand side; this results in the values 00001 00010 01010 10000 11111 00001, with a number of leading 0s being removed from the left-hand side. These chunks are then placed into reverse order, with the rightmost chunk going on the left and vice-versa; this results in the values 00001 11111 10000 01010 00010 00001.

Once at that point, each value should be ORed with 0x20 (that is, have a leading 1 added) if it is not the final value in the list. This yields the values 100001 111111 110000 101010 100010 000001, with only the final value not having a leading 1. These values should then be converted into decimal form, resulting in the values 33 63 48 42 34 1. The user should then convert these values into ASCII by adding 63 to each value (96 126 111 105 97 64) and converting those numbers, in the final output, to their ASCII equivalents ('~oia@).

A user that desires to convert values back from polyline form into coordinate form may do so by following these steps in reverse order. For example, first, the user can convert the polyline data ('~oia@) into decimalized data (96 126 111 105 97 64) and subtract 63 (33 63 48 42 34 1). This may allow a user to convert polyline data into coordinate form.

Once the data has been transformed into spherical coordinate form 108, such as a decimalized latitude-longitude system or another system, it may be desirable to interpolate the provided data points 110 in order to provide a higher density of waypoints to be read by the controller. According to one exemplary embodiment, the data points provided by the API or other data source may be interpolated until the distance between each individual waypoint is less than some desired distance, for example 50 or 60 feet. According to another exemplary embodiment, waypoints may be added via interpolation and removed via deletion until the distance between all waypoints is between two values, for example 50 feet and 60 feet. A variety of interpolation methods, such as linear interpolation, cosine interpolation, cubic interpolation, or Hermite interpolation, may be used, as desired; an interpolation method may be chosen depending on criteria like the density of the data points undergoing interpolation or the known presence or absence of any unusual terrain features. Alternatively, according to a still another exemplary embodiment, a plurality of waypoints may be fit to a curve using linear or nonlinear regression, and new waypoints may be generated at the appropriate positions on this curve without requiring interpolation to take place between individual points or sets of points.

For example, the exemplary polyline "e|lfGlevbN|@vDJf@~@'EVx@N'@" might be decoded into a series of points that are represented by the values (43.16115, −79.25351), (43.16084, −79.25443), (43.16078, −79.25463), (43.16046, −79.2556), (43.16034, −79.25589), (43.16026, −79.25606), with the first point in the pairing representing the latitude of a GPS coordinate (in this case, the latitude north) and the second point in the pairing representing the longitude of a GPS coordinate (in this case, the longitude west). In this example, there is a much larger distance between the first and second coordinates, and between the third and fourth coordinates, than there is between any of the other coordinates. For example, the distance between the point represented by the first set of coordinates and the point represented by the second set of coordinates is 270 feet. However, it may be desirable to have the final set of waypoints spaced less than 60 feet apart, which may require interpolation between the first and second set of coordinates to generate more waypoints. Since the coordinates are arranged in a line, along a substantially straight section of roadway, linear interpretation may be appropriate for this section. 270 divided by 5 is 54 feet, which is within the desirable range; therefore, four points should be added via linear interpolation between these two points in order to divide this section into five segments of 54 feet in length. The same process may be completed for any other sections, where appropriate or as desired.

Once an appropriate number of new waypoints have been generated in all applicable sections, the set of waypoints may be stored in a database 112. Distance measurements between data points may be generated from these values and likewise stored in the database, if desired. Alternatively, a desired distance measurement between waypoints may be defined, for example 50 feet, and new waypoints may be generated as necessary to reflect this desired distance measurement. Alternatively, both methods may be used, and/or the new waypoints may be combined with existing database data, as desired. According to some exemplary embodiments, this database may then be transmitted to a vehicle controller, or may be manually provided to a vehicle controller; according to other embodiments, this process may be executed directly by a vehicle controller with access to an API or other resource. Other embodiments may also be utilized or understood.

For example, according to one exemplary embodiment, a database may be stored on a computer system separate from the vehicle controller. This computer system may obtain route information and convert that into waypoint information, either manually or automatically, as desired. A user may then be able to edit this database, adding announcements or other location-specific instructions that are paired with particular waypoint locations, or which are otherwise triggered to occur at certain points along the route. This database may then be provided in relevant part, for example on computer-readable media or by wireless transmission, to the vehicle controllers installed in particular mass transit vehicles. Optionally, the operator of the mass transit vehicle or another party may be able to add, edit, or remove these announcements or even the waypoint data via an interface of their own, such as a touch-screen interface or microphone. Alternatively, the operator of the mass-transit vehicle may be able to request such a change or inform a control station of the need for some aspect of the waypoint data database to be updated; for example, a bus driver may inform the control station of the need to edit a route in the event that a road is blocked by a traffic accident, and the control station may be able to update the waypoint data corresponding to the bus's planned route to waypoint data reflecting the bus's new route. This data may then be wirelessly transmitted to the bus's vehicle controller, updating the bus's own waypoint data and planned announcements. Other embodiments of this system may be envisioned, as desired.

This database of GPS coordinate and distance measurement pairings may then be used with existing mass transit information systems. Transformation of the data may be done, where necessary or desired, to fit the requirements of the hardware environment. For example, it may be that a particular mass transit vehicle information system is intended to operate based off of a series of GPS waypoints, each waypoint being approximately fifty to sixty feet from the previous waypoint, and a series of distance measurements paired with waypoints or waypoint pairs. Providing waypoints substantially outside of this range may run the risk that the system controllers will go "off route" or that they will encounter other problems. Rather than design a new hardware system that operated based on waypoints that are spaced more closely or further apart, interpolation and consolidation of the data can be done where appropriate in order to provide appropriate inputs to the hardware system. (Alternatively, it may be that the hardware system may be able to handle being provided with waypoints that are spaced too closely or too far apart, and that the hardware system will be able to stay "on route" when such waypoints are provided. In this case, interpolation and/or consolidation of the data may be less necessary or less desired.) GPS waypoint and distance data may be supplied, in the form of a database or other data structure, to an information system controller; the information system controller may in turn operate other devices on the mass transit vehicle system, such as an automated voice announcement system or an external display, or another appropriate device, as desired.

Certain GPS coordinate and distance measurement pairings might be paired in the database with certain information to be announced or displayed at the time that a certain GPS coordinate is reached or a certain distance is travelled. For example, at one series of points, there might be instructions for the external display to display the name of the next stop that the bus is scheduled to stop at, and there might be instructions for the automated voice announcement system to announce the name of the next stop to the passengers. When the bus reaches the appropriate GPS coordinate, the instructions might be read by the system controller and transmitted to the automated voice announcement system and the external display, announcing to the customers what the bus's next stop is and providing that information on the external display as well. Other instructions may also be stored or may be generated by the mass transit information system, as desired. This may include instructions for any other systems controlled by the mass transit vehicle information system, if applicable.

The mass transit information system may then periodically compare the database data, containing stored GPS coordinates and distance measurements, and GPS and distance data that it has obtained through its own instrumentation. Once the mass transit vehicle has reached or passed specific waypoints described in the database, the mass transit information system might update subsystems like the external display if such behavior is defined in the database or otherwise desired.

Figure 2:
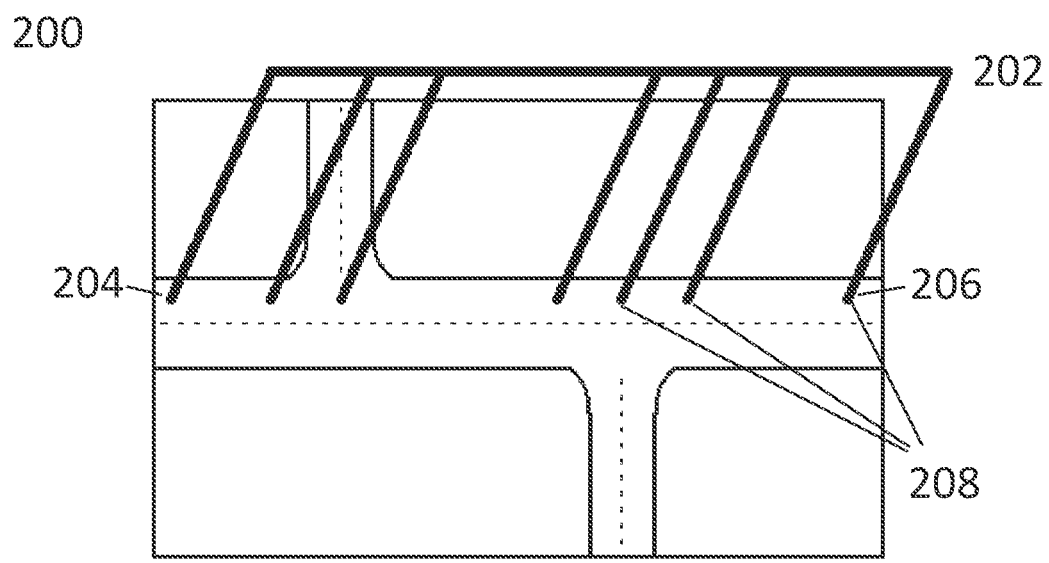
FIG. 2 shows a visualization of mapping data that may be provided by a map utility API or other data repository.

Referring now to exemplary FIG. 2, a visualization of mapping data 200 that may be provided by a map utility API or other data repository may be provided. The API may provide a route 202 between a start point 204 and an end point 206, which may include a number of other data points 208 also included along that route. The route 202 may be provided as a vector or plurality of vectors; according to such an embodiment, only a first data point 204 may be provided, and other data points may be described based on their relation to this first data point 204.

Figure 3:
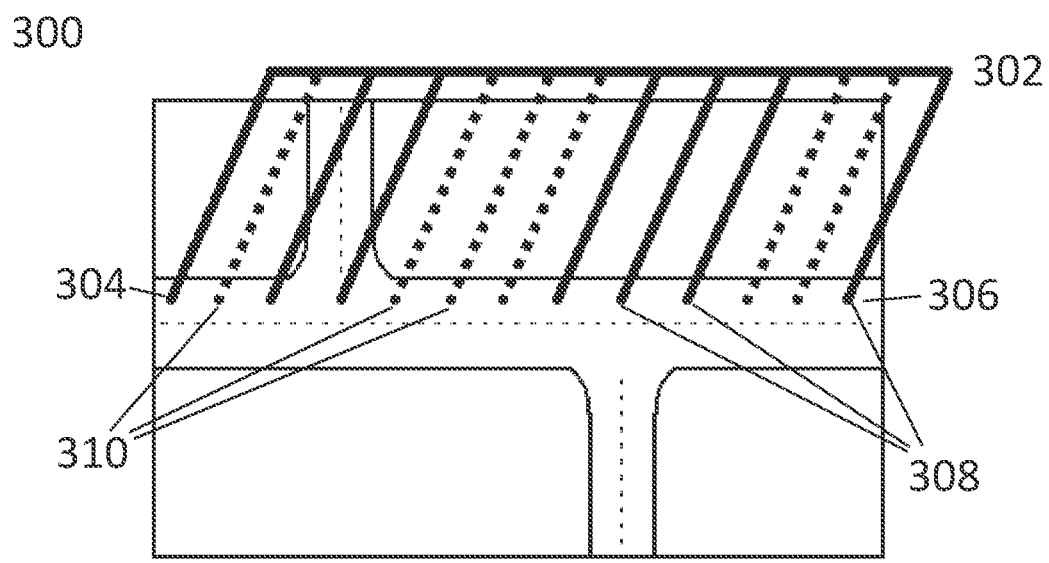
FIG. 3 shows a visualization of interpolated waypoint data.

Referring now to exemplary FIG. 3, a visualization of interpolated waypoint data 300 may be provided. Mapping data may first be provided in the form of a route 302 and a start point 304, but may be converted into coordinate form, where it may be represented instead by a start point 304, an end point 306, and any intermediate waypoints 308. There may, however, be stretches or locations where there is a scarcity of data points provided in the initial route data 302 and thus long stretches between waypoints 308. In this case, interpolated waypoints 310 can be created to "fill the gaps" or otherwise provide appropriate waypoint data.

Figure 4:
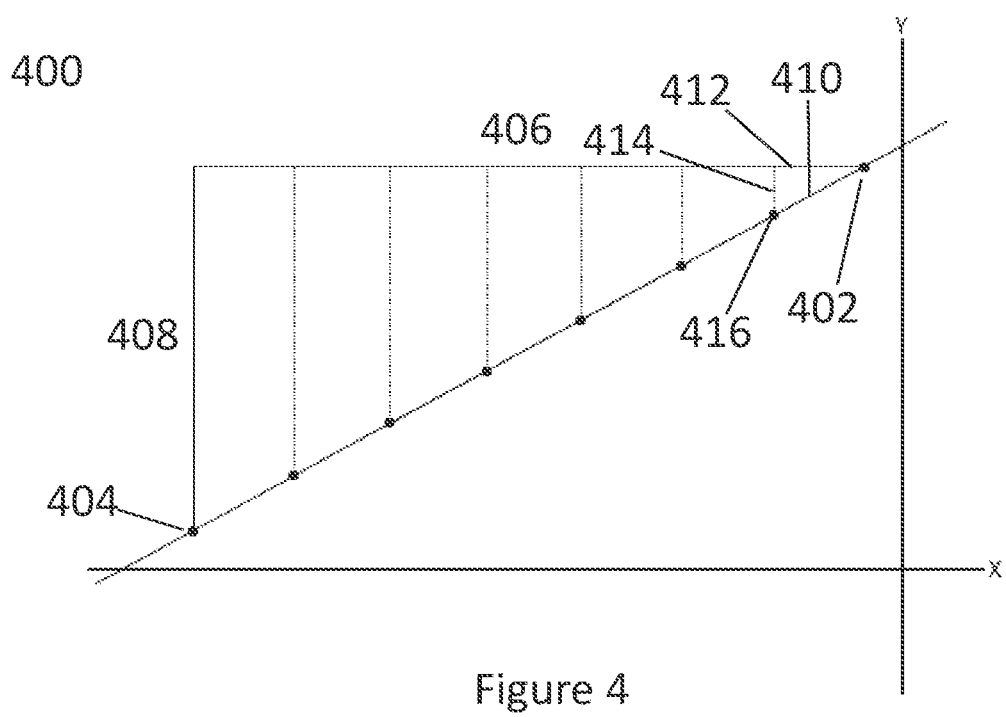
FIG. 4 shows a visualization of the linear interpolation process that may be used to create new waypoints for the system hardware.

Referring now to exemplary FIG. 4, a visualization of the linear interpolation process 400 that may be used to create new waypoints for the system hardware may be provided. A route may exist between a first waypoint 402 and a second waypoint 404. There may be a desired subdivision size between the two waypoints 410, such that a number of intermediate waypoints 412 may be added between the first waypoint 402 and second waypoint 404 in order to better accommodate the demands of the system hardware. As such, the distance between the two waypoints 402, 404 in longitude 406 and in latitude 408 may be computed. These values may be used to compute the slope of a line drawn between the two waypoints. From the slope value and from the desired subdivision size 410, a longitude adjustment 412 and a latitude adjustment 414 from a point 402 to a new waypoint 416 may be calculated. This process may be repeated with points further away from the original waypoint 402; the process may be repeated with the new waypoint 416 standing in for the original waypoint 402, or the desired subdivision size 410 may be effectively increased to a multiple of its original value for the purposes of computation. As previously mentioned, nonlinear interpolation methods may also be employed, if desired.

Figure 5:
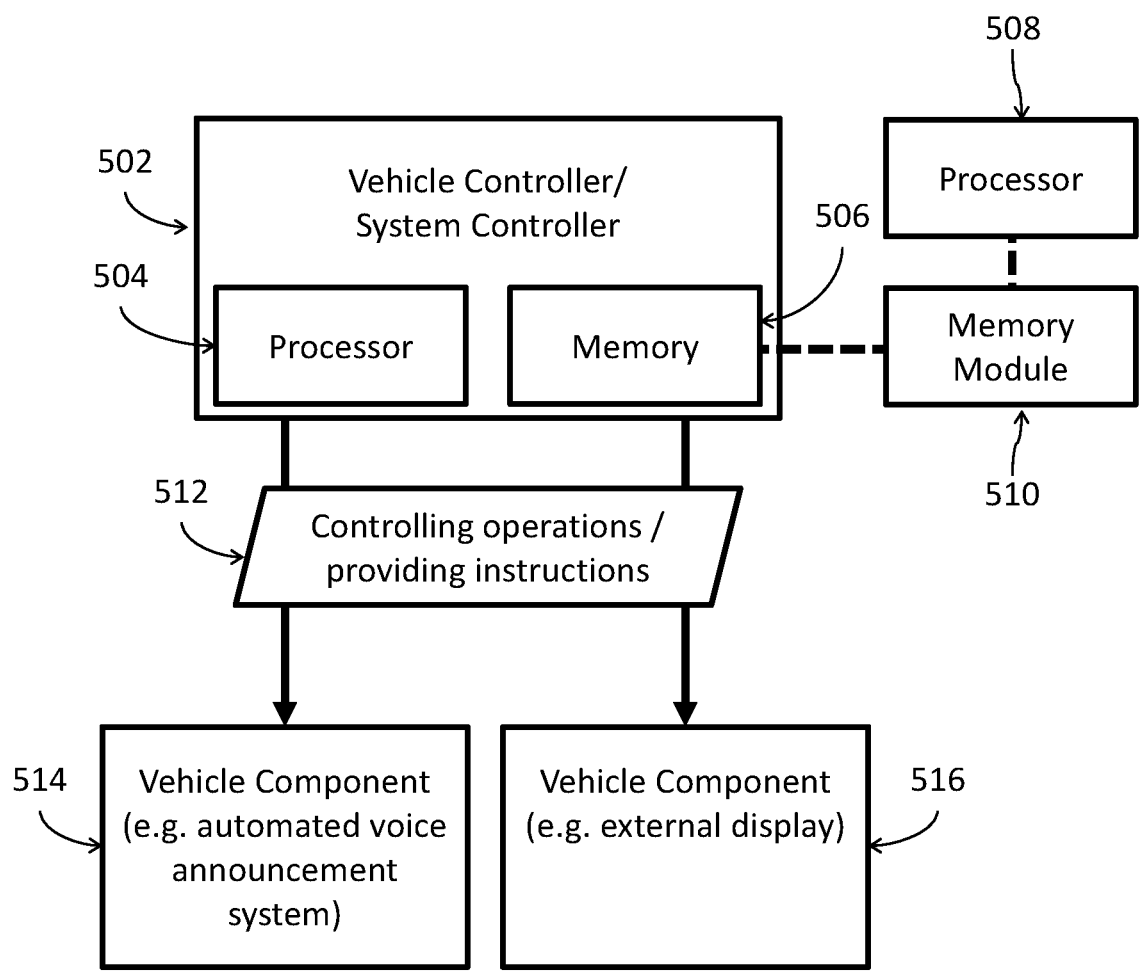
FIG. 5 shows an exemplary system diagram for a vehicle controller.

Referring now to exemplary FIG. 5, FIG. 5 shows an exemplary system diagram for a vehicle controller system 500. In an exemplary embodiment, the vehicle controller system 500 may include a vehicle controller 502, which may include, for example, a processor 504 and a memory 506. The vehicle controller 502 may be configured to communicate with a processor 508 and memory module 510.

In an exemplary embodiment, the vehicle controller 502 may be configured to control the operation of at least one component of a vehicle, or provide instructions for the at least one component of a vehicle 512. These vehicle components 514, 516 may include, for example, an automated voice announcement system 514, an external display 516, or any other vehicle components 514, 516 that may be desired.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A computer-implemented method for generating waypoint data, comprising the steps of:
receiving route data and storing the route data in a first memory location;
generating, with a processor, coordinate data from the route data, and storing the coordinate data in a second memory location, wherein the route data is polyline-encoded vector data comprising a continuous string of American Standard Code for Information Interchange (ASCII) characters representing at least a starting point defined in terms of absolute longitude and latitude and a plurality of successive points defined based on their difference in longitude and latitude from a previous point, a first point in the plurality of successive points defined based on a difference in longitude and latitude from the starting point, wherein for each ASCII character in the continuous string of ASCII characters the processor converts each ASCII character into a plurality of decimalized data values, subtracts a constant from each of the decimalized data values, converts the plurality of decimalized data values into a binary sequence comprising a plurality of constant-width binary chunks, and converts the binary sequence into a global positioning system (GPS) coordinate value in the coordinate data;
identifying, with the processor, a maximum allowable distance for waypoints that is permitted by a vehicle controller comprising the processor, the vehicle controller configured to control an operation of at least one component of a vehicle, wherein the at least one component of the vehicle comprises at least one of an automated voice announcement system and/or an external display;
comparing, with the processor on a pair-by-pair basis, distances between pairs of consecutive coordinate data points and the maximum allowable distance for waypoints;
identifying, with the processor, those pairs of consecutive waypoints having a distance between them that is greater than the maximum allowable distance for waypoints;
converting, with the processor, the coordinate data into properly-spaced waypoint data by adding interpolated waypoints between those pairs of consecutive waypoints having the distance between them that is greater than the maximum allowable distance for waypoints until no such pairs of consecutive waypoints exist;
accessing, with the processor, the properly-spaced waypoint data and instructions for the at least one component of the vehicle that are associated with the properly-spaced waypoint data; and
controlling the operation of the at least one component of the vehicle, with the processor, by automatically triggering at least one of an announcement from the automated voice announcement system and/or information to be displayed on the external display, based on the properly-spaced waypoint data and the instructions.

2. The method of claim 1, further comprising the additional step of storing the properly-spaced waypoint data in one or more of the first memory location, the second memory location, and/or a third memory location.

3. The method claim 1, wherein the coordinate data is at least partially converted into the properly-spaced waypoint data by linear interpolation.

4. The method of claim 1, wherein the coordinate data is at least partially converted into the properly-spaced waypoint data by nonlinear interpolation.

5. The method of claim 1, wherein the at least one component of the vehicle comprises both the automated voice announcement system and the external display, and wherein the vehicle controller is configured to access the instructions for the at least one component of the vehicle that are associated with the properly-spaced waypoint data and automatically trigger both the announcement from the automated voice announcement system and the information to be displayed on the external display, based on the instructions and the properly-spaced waypoint data.

6. The method of claim 5, further comprising using the automated voice announcement system to play an announcement to passengers of the vehicle when a selected waypoint has been reached.

7. The method of claim 6, wherein the selected waypoint comprises a stop, and further comprising making a stop announcement as the vehicle approaches the stop.

8. The method of claim 5, wherein the properly-spaced waypoint data comprises a waypoint comprising a next planned stop, and further comprises additional instructions directing the external display to display a name of the next planned stop, said additional instructions being associated with a particular waypoint preceding the waypoint comprising the next planned stop; and
wherein the vehicle controller is configured to automatically display, on the external display, the next planned stop of the vehicle based on the additional instructions when the particular waypoint has been reached.

9. The method of claim 1, wherein the properly-spaced waypoint data further comprises distance measurements.

10. A system for generating waypoint data, comprising:
a first memory location configured to receive and store route data;
a second memory location configured to receive and store waypoint data;
at least one component of a vehicle comprising at least one of an automated voice announcement system and/or an external display; and
a vehicle controller configured to control an operation of the at least one component of the vehicle, the vehicle controller comprising a processor, and further configured to generate coordinate data from the route data and generate the waypoint data from the coordinate data, wherein the route data is polyline-encoded vector data comprising a continuous string of American Standard Code or Information interchange (ASCII) characters representing at least a starting point defined in terms of absolute longitude and latitude and a plurality of successive points defined based on their difference in longitude and latitude from a previous point, a first point in the plurality of successive points defined based on a difference in longitude and latitude from the starting point, and wherein for each ASCII character in the continuous string of ASCII characters the processor is configured to convert each ASCII character into a plurality of decimalized data values, subtract a constant from each of the decimalized data values, convert the plurality of decimalized data values into a binary sequence comprising a plurality of constant-width binary chunks, and convert the binary sequence into a global positioning system (GPS) coordinate value in the coordinate data;

wherein the vehicle controller is further configured to generate the waypoint data from the coordinate data by identifying a maximum allowable distance for waypoints that is permitted by the vehicle controller, compare, on a pair-by-pair basis, distances between pairs of consecutive coordinate data points and the maximum allowable distance for waypoints that is permitted by the vehicle controller, identify those pairs of consecutive waypoints having a distance between them that is greater than the maximum allowable distance for waypoints that is permitted by the vehicle controller, and convert the coordinate data into properly-spaced waypoint data by adding interpolated waypoints between those pairs of consecutive waypoints having the distance between them that is greater than the maximum allowable distance for waypoints that is permitted by the vehicle controller until no such pairs of consecutive waypoints exist;

wherein the vehicle controller is further configured to access the properly-spaced waypoint data and instructions for the at least one component of the vehicle that are associated with the properly-spaced waypoint data, and control the operation of the at least one component of the vehicle based on the properly-spaced waypoint data and the instructions by automatically triggering at least one of an announcement from the automated voice announcement system and/or information to be displayed on the external display.

11. The system of claim 10, wherein the coordinate data is at least partially converted into properly-spaced waypoint data by linear interpolation.

12. The system of claim 10, wherein the coordinate data is at least partially converted into properly-spaced waypoint data by nonlinear interpolation.

13. The system of claim 10, wherein the at least one component of the vehicle comprises both the automated voice announcement system and the external display, and wherein the vehicle controller is configured to access the instructions for the at least one component of the vehicle that are associated with the properly-spaced waypoint data and automatically trigger both the announcement from the automated voice announcement system and the information to be displayed on the external display, based on the instructions and the properly-spaced waypoint data.

14. The system of claim 13, wherein the vehicle controller is further configured to control the automated voice announcement system to play an announcement to passengers of the vehicle when a selected waypoint has been reached.

15. The system of claim 14, wherein the selected waypoint comprises a stop, and the automated voice announcement system is further configured to make a stop announcement as the vehicle approaches the stop.

16. The system of claim 13, wherein the properly-spaced waypoint data comprises a waypoint comprising a next planned stop, and further comprises additional instructions directing the external display to display a name of the next planned stop, said additional instructions being associated with a particular waypoint preceding the waypoint comprising the next planned stop; and wherein the external display is configured to automatically display the next planned stop of the vehicle based on the additional instructions when the particular waypoint has been reached.

17. The system of claim 10, wherein the properly-spaced waypoint data further comprises distance measurements.

18. A computer program product embodied on a non-transitory computer readable medium, comprising code executable by a computer arranged to communicate with at least one vehicle controller, to cause the computer to carry out the following steps:

receiving route data and storing the route data in a first memory location;

generating, with a processor, coordinate data from the route data, and storing the coordinate data in a second memory location, wherein the route data is polyline-encoded vector data comprising a continuous string of American Standard Code for Information Interchange (ASCII) characters representing at least a starting point defined in terms of absolute longitude and latitude and a plurality of successive points defined based on their difference in longitude and latitude from a previous point, a first point in the plurality of successive points defined based on a difference in longitude and latitude from the starting point, wherein for each ASCII character in the continuous string of ASCII characters the processor converts each ASCII character into a plurality of decimalized data values, subtracts a constant from each of the decimalized data values, converts the plurality of decimalized data values into a binary sequence comprising a plurality of constant-width binary chunks, and converts the binary sequence into a global positioning system (GPS) coordinate value in the coordinate data;

identifying, with the processor, a maximum allowable distance for waypoints that is permitted by a vehicle controller comprising the processor, the vehicle controller configured to control an operation of at least one component of a vehicle, wherein the at least one component of the vehicle comprises at least one of an automated voice announcement system and/or an external display;

comparing, with the processor on a pair-by-pair basis, distances between pairs of consecutive coordinate data points and the maximum allowable distance for waypoints;

identifying, with the processor, those pairs of consecutive waypoints having a distance between them that is greater than the maximum allowable distance for waypoints;

converting, with the processor, the coordinate data into properly-spaced waypoint data by adding interpolated waypoints between those pairs of consecutive waypoints having the distance between them that is greater than the maximum allowable distance for waypoints until no such pairs of consecutive waypoints exist;

accessing, with the processor, the properly-spaced waypoint data and instructions for the at least one component of the vehicle that are associated with the properly-spaced waypoint data; and controlling the operation of the at least one component of the vehicle, with the processor, by automatically triggering at least one of an announcement from the automated voice announcement system and/or information to be displayed on the external display, based on the properly-spaced waypoint data and the instructions.

* * * * *